United States Patent Office 2,866,837
Patented Dec. 30, 1958

2,866,837

CATALYTIC ALKYLATION OF HYDROCARBONS

Heinz Heinemann, Swarthmore, Pa., assignor to Houdry Process Corporation, Wilmington, Del., a corporation of Delaware No Drawing. Application August 25, 1952
Serial No. 306,289

2 Claims. (Cl. 260—683.64)

The present invention relates to catalytic hydrocarbon conversion processes and is particularly concerned with such processes including as one of the reactions in the formation of valuable hydrocarbons in the gasoline boiling range and of high anti-knock qualities, alkylation of hydrocarbons charged to the reaction zone or formed in such zone by other concomitant reactions taking place. More specifically in accordance with one aspect of the invention, reaction is effected between isoparaffins and olefins to produce acceptable yields of liquid alkylation products of higher molecular weight than said isoparaffin. In the preferred embodiment the isoparaffin fraction employed is one containing a substantial quantity of isobutane, or in general such fractions containing $C_3$–$C_5$ paraffins.

While under the general conditions of pressure and temperature at which alkylation takes place there is not precluded the possibility that a portion of the olefins may interact to limited extent to produce dimers and higher molecular weight acyclic and carbocyclic hydrocarbons, the reaction conditions employed in accordance with the invention are such as to minimize the extent of such polymerization.

The reaction of isoparaffins with olefins to form products of higher molecular weight is thermodynamically possible at low temperature and in the absence of catalyst; the reaction rate, however, is relatively slow under these conditions. With increasing temperature there are introduced a number of competing side reactions including that of polymerization of the olefins which may become predominant. To increase the rate of alkylation resort was had to the use of catalysts, which are employed in liquid or vapor phase, solid catalysts being ruled out because of the extent of accompanying coke formation limiting the active life of the catalyst. These processes utilizing catalyst in liquid or vapor phase, while commercially accepted, present complicated problems of separation of desired hydrocarbon products from the catalyst and are comparatively expensive from the standpoint of net catalyst cost and that of equipment maintenance.

In accordance with the present invention hydrogenated higher molecular weight hydrocarbons in the gasoline boiling range are directly obtained from lower molecular weight hydrocarbons and without substantial coke formation, by effecting reaction of these lower molecular weight hydrocarbons in the presence of a solid dual-function catalyst, comprising a hydrogenation-dehydrogenation promoting component in intimate association with a component having activity in promoting acid catalyzed hydrocarbon conversion reactions. Hydrogen (or recycled hydrogen-rich gas) employed in the process is effective not only in limiting the rate or extent of polymerization of olefins present in the reaction zone, but also in preventing continued interaction of these and other unsaturates ordinarily leading to the production of extremely high molecular weight hydrocarbonaceous products such as coke.

As hydrocarbon charge to the process there is preferably employed a mixture of light isoparaffins and olefins which may be normally gaseous or just within the low end of normally liquid fractions, such as the typical B—B fraction (mixture of chiefly saturated and unsaturated $C_4$ hydrocarbons) available from other refinery processes, the mol ratio of available isoparaffins to olefins in the reaction zone being maintained at not less than 4:1 by recycling of the saturated hydrocarbons or otherwise.

Suitable catalysts of the dual-function type, that may be employed in the process, include those containing platinum. Among the suitable supports or carriers for these noble metal catalysts there may be named HF-treated alumina or alumina otherwise containing combined halogen, as well as gamma alumina or the familiar activated alumina of commerce which has been acid treated in that state prior to impregnation with a platinum salt or complex such as chloroplatinic acid.

The hydrocarbon conversion in accordance with the invention is generally carried out under conditions at which the equilibrium favors alkylation rather than cracking or dealkylation, such as at temperatures between 100° and 700° F. and at pressures of from about 200 to 2500 pounds.

*Example*

A fraction of the following composition:

| | Wt. percent |
|---|---|
| $C_3$'s and lighter | 5 |
| n-Butane | 20 |
| i-Butane | 40 |
| Butenes (normal + iso) | 15 |
| $C_5$'s | 20 | obtained from catalytic cracking of a gas oil is passed over a catalyst composed of 6% molybdenum oxides (as $MoO_3$) on silica-alumina gel prepared by impregnating commercial calcined silica-alumina gel pellets (87.5% $SiO_2$, 12.5% $Al_2O_3$) with ammonium molybdate, drying and calcining. Prior to introduction of the hydrocarbon charge, the catalyst is charged to the reaction vessel, which vessel is then brought up to operating pressure with hydrogen, thereby reducing the molybdena to lower oxide state. The reaction is carried out at 800° F., 200 p. s. i. with the addition of one mol of hydrogen per mol of the hydrocarbon charge, the latter being supplied to the reactor at a space rate of 4 volumes per hour per volume of catalyst. Substantially all of the butenes are converted in the process going largely to the production of $C_5$ and higher saturated hydrocarbons, with the following yields (calculated on loss-free basis):

| | Wt. percent |
|---|---|
| $C_{5+}$ | 38 |
| Isobutane | 37 |
| Butane | 18 |
| $C_3$'s and lighter | 7 |

Obviously many modifications and variations of the invention as hereinbefore set forth may be made without departing from the spirit and scope thereof and therefore only such limitations should be imposed as are indicated in the appended claims.

I claim:

1. The method of preparing gasoline products of good anti-knock qualities which comprises: preparing a mixture of a recycle stream and fresh feed, said mixture consisting essentially of $C_3$–$C_5$ hydrocarbons and hydrogen, there being about one mol of hydrogen per mol of hydrocarbon and there being a significant proportion of olefins and a still greater quantity of saturated isoparaffin hydrocarbons in said mixture so that the mol ratio of isoparaffins to olefins is not less than 4:1; passing said mixture at a space rate of about 4 volumes of liquid hydrocarbon per hour per volume of catalyst at a temperature of about 800° F. at a pressure of about 200 p. s. i. g.

through a catalytic zone characterized by a dual-function catalyst comprising an aluminaceous carrier having the property of promoting acid-catalyzed reactions said carrier having a minor quantity of hydrogenation-dehydrogenation promoting component intimately associated therewith whereby olefins and isoparaffins undergo an alkylation reaction to form hydrocarbon products of the gasoline boiling range; withdrawing the effluent from the catalytic zone; separating from said effluent a recycle stream consisting of $C_3$-$C_5$ hydrocarbons and hydrogen for inclusion in said mixture; and separating and withdrawing gasoline products of good anti-knock qualities from said effluent.

2. The method of preparing gasoline products of good anti-knock qualities which comprises: preparing a mixture of a recycle stream and fresh feed, said mixture consisting essentially of $C_3$-$C_5$ hydrocarbons and hydrogen, there being about one mol of hydrogen per mol of hydrocarbon and there being a significant proportion of olefins and a still greater quantity of saturated isoparaffin hydrocarbons in said mixture so that the mol ratio of isoparaffins to olefins is not less than 4:1; passing said mixture at a space rate of about 4 volumes of liquid hydrocarbon per hour per volume of catalyst at a temperature of about 800° F. at a pressure of about 200 p. s. i. g. through a catalytic zone containing a dual-function catalyst prepared by treating gamma activated alumina with acid and impregnating the acid treated gamma alumina with chloroplatinic acid, whereby olefins and isoparaffins undergo an alkylation reaction to form hydrocarbon products of the gasoline boiling range; withdrawing the effluent from the catalytic zone; separating from said effluent a recycle stream consisting of $C_3$-$C_5$ hydrocarbons and hydrogen for inclusion in said mixture; and separating and withdrawing gasoline products of good anti-knock qualities from said effluent.

References Cited in the file of this patent
UNITED STATES PATENTS

| | | |
|---|---|---|
| 2,332,276 | Stahly | Oct. 19, 1943 |
| 2,364,430 | Ellis | Dec. 5, 1944 |
| 2,375,573 | Meier | May 8, 1945 |
| 2,560,329 | Brandon | July 10, 1951 |
| 2,608,534 | Fleck | Aug. 26, 1952 |
| 2,630,404 | Berger | Mar. 3, 1953 |